Patented June 28, 1932

1,865,196

UNITED STATES PATENT OFFICE

OSKAR LOEHR, OF UERDINGEN-NIEDERRHEIN, GERMANY, ASSIGNOR TO I. G. FARBEN-INDUSTRIE AKTIENGESELLSCHAFT, OF FRANKFORT-ON-THE-MAIN, GERMANY

MANUFACTURE OF A NEW COMPOSITION OF MATTER WITH A BASE OF CELLULOSE ESTERS

No Drawing. Application filed May 5, 1927, Serial No. 189,183, and in Germany May 7, 1926.

The present invention concerns the manufacture of soft and pliable masses from cellulose esters, in particular nitro or acetyl cellulose, consisting in the addition of esters of polyglycols or their monoalkyl or aralkyl ethers.

The simplest polyglycols are the polyethyleneglycols of the general formula:—

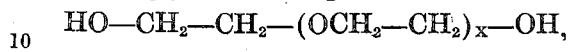

wherein $x$ indicates any whole number. The monoalkylether of these polyglycols have therefore the general formula:—

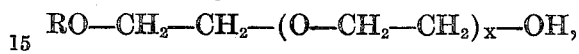

wherein R indicates any aliphatic residue (alkyl or aralkyl).

Instead of polyethyleneglycols their homologues, as for example polypropyleneglycols and their ethers, can be employed in the sense of my invention, or likewise such mixtures of polyglycols and their ethers, as can be obtained by the action of mixtures of ethylene oxide, propylene oxide and the subsequent homologues on water or alcohol. All the aforesaid polyglycol compounds may be represented by the general formula:

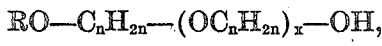

wherein $n$ is more than one, $x$ indicates any whole number and R stands for a hydrogen atom or an alkyl or aralkyl group.

The acid used in the esterification is so chosen that the resulting ester should boil within the desired limits. In order to produce a good plasticizing agent the limits of boiling point lie in general between 300 and 400° C. at normal pressure. According to the molecular weight of the polyglycol employed, that is to say according to the number of $x$ and the size of the ester R in the above formulæ the boiling points of the free polyglycols and their monoalkyl ethers vary correspondingly. Those of lower boiling point, as for example diethyleneglycol and diethyleneglycolmonoethylether, must be esterified with acids of high molecular weight so that they should yield substances of a sufficiently high boiling point. Or alternatively for this purpose two molecules of the original compound must be combined by means of a carbonic acid residue. In the case of the polyglycols of high molecular weight, as for example pentaethyleneglycol, esterification with acetic acid suffices.

The said esters possess the property of giving films of great softness, pliability and resistance to cold, both with nitro cellulose and with cellulose acetate, the products being excellently suited to the manufacture of artificial masses, lacquers, artificial leather and the like.

In the application of my invention I dissolve for example, 100 parts of nitro cellulose together with 50 parts of a mixture of the benzoic acid esters of polyethyleneglycolmonoethylethers (boiling under normal pressure between 315 and 355° C.) in 300 parts of butyl acetate, 150 parts of alcohol and 150 parts of benzene. The solution on pouring and evaporating the solvent yields a film of excellent properties.

In a similar manner a film can be produced from acetyl cellulose with the addition of a diacetate, obtained by the acetylation of a mixture of polyethylene glycols, boiling between 290–340° C. The proportion of acetyl cellulose to plasticizing agent can in this case likewise be chosen in the ratio of 2:1. As solvent a mixture of 80 parts of acetone and 20 parts of cyclohexanone is employed.

The foregoing examples are intended to illustrate the wide applicability of my invention, which can naturally be varied to suit individual requirements and the conditions under which the new products are to be employed.

I claim:—

1. A composition of matter comprising a cellulose ester and an ester of a polyglycol-monoalkylether boiling above about 300° C., said composition being excellently suited for the manufacture of artificial masses, lacquers, artificial leather and the like.

2. A composition of matter comprising a nitrocellulose and the benzoic esters of polyethyleneglycolmonoethyl ethers boiling above about 300° C., said composition being excellently suited for the manufacture of artificial masses, lacquers, artificial leather and the like.

In testimony whereof I have hereunto set my hand.

OSKAR LOEHR.